US012651009B2

(12) United States Patent
Elder et al.

(10) Patent No.: US 12,651,009 B2
(45) Date of Patent: Jun. 9, 2026

(54) SYSTEMS AND METHODS FOR DYNAMIC VISUALIZATIONS OF CONTROL AREAS

(71) Applicant: Palantir Technologies Inc., Denver, CO (US)

(72) Inventors: Andrew Elder, Denver, CO (US); Andrew Locke, Alexandria, VA (US); Rebecca Moore, Washington, DC (US); Eric Raboin, Arlington, VA (US); Stephen Fennell, Severna Park, MD (US); Jasmine Peterson, Mountain View, CA (US); Westin Miller, Palo Alto, CA (US)

(73) Assignee: Palantir Technologies Inc., Aventura, FL (US)

( * ) Notice: Subject to any disclaimer, the term of this patent is extended or adjusted under 35 U.S.C. 154(b) by 681 days.

(21) Appl. No.: 18/082,747

(22) Filed: Dec. 16, 2022

(65) Prior Publication Data

US 2024/0104123 A1 Mar. 28, 2024

Related U.S. Application Data

(60) Provisional application No. 63/409,019, filed on Sep. 22, 2022.

(51) Int. Cl.
| | |
|---|---|
| *G06F 16/29* | (2019.01) |
| *G01C 21/32* | (2006.01) |
| *G06T 7/62* | (2017.01) |

(52) U.S. Cl.
CPC ............. *G06F 16/29* (2019.01); *G01C 21/32* (2013.01); *G06T 7/62* (2017.01)

(58) Field of Classification Search
None
See application file for complete search history.

(56) References Cited

U.S. PATENT DOCUMENTS

| | | | |
|---|---|---|---|
| 2020/0355457 A1 | 11/2020 | Deng et al. | |
| 2021/0072755 A1* | 3/2021 | Chae .................... | G05D 1/0214 |

FOREIGN PATENT DOCUMENTS

| | | |
|---|---|---|
| CN | 106777365 | 9/2017 |
| EP | 4343523 A1 | 3/2024 |
| WO | WO 2021/225652 | 11/2021 |

OTHER PUBLICATIONS https://web.archive.org/web/20221214060545/https://en.wikipedia.org/wiki/Front_line.
European Patent Office, Extended European Search Report mailed Feb. 2, 2024, in Application No. 23198643.1.

* cited by examiner

*Primary Examiner* — Andrew H Lam
(74) *Attorney, Agent, or Firm* — Faegre Drinker Biddle & Reath LLP

(57) ABSTRACT

System and method for control area visualization according to certain embodiments. For example, a method includes: receiving object data from a plurality of data sources; identifying a plurality of first objects associated with a first group based at least in part on the object data, each first object of the plurality of first objects being associated with a geospatial location and a buffer area; determining a first control area associated with the first group based at least in part on the geospatial location and the buffer area of each first object of the plurality of first objects; and causing a presentation of the first control area on a display.

17 Claims, 8 Drawing Sheets

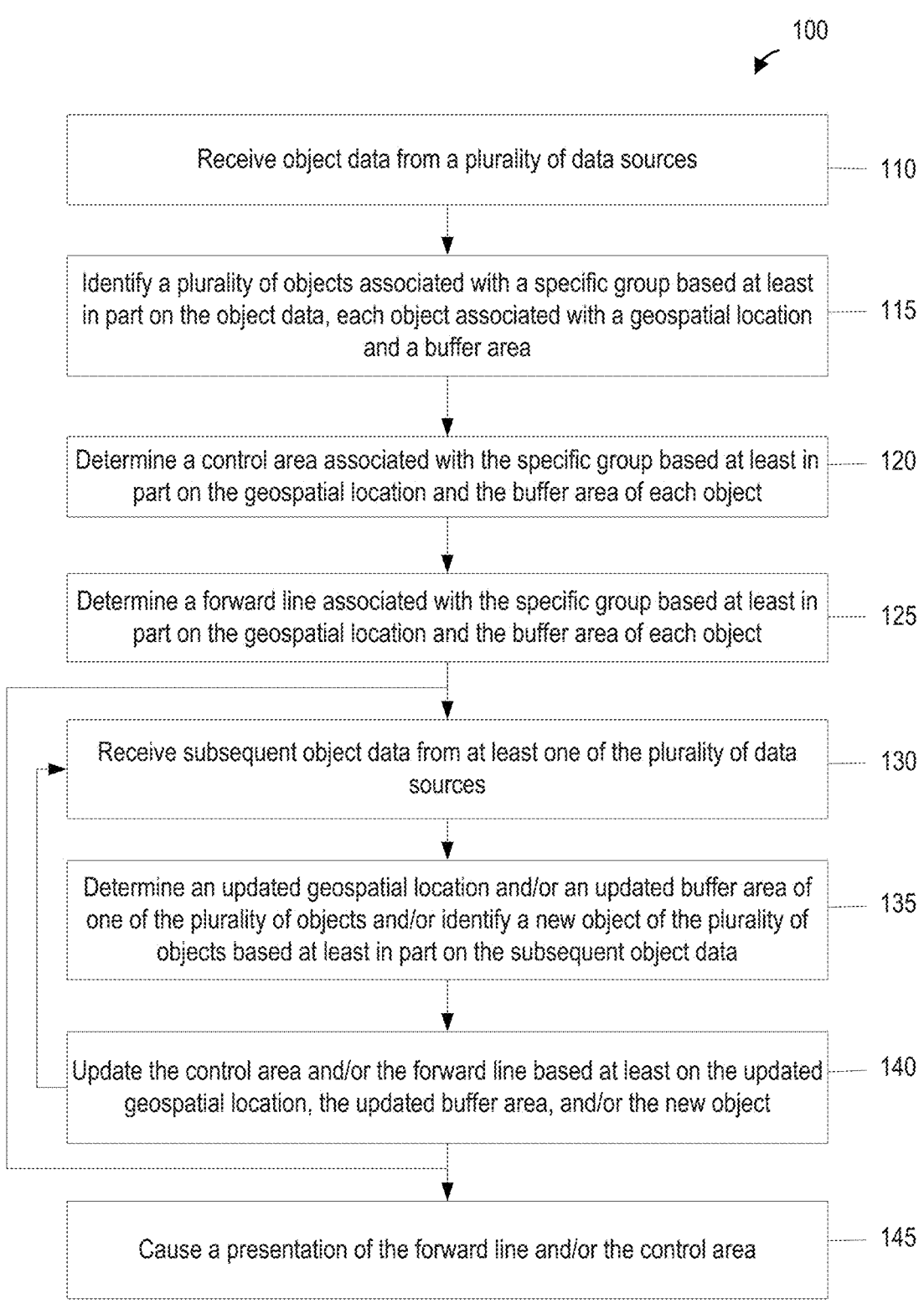

100

Receive object data from a plurality of data sources ——— 110

Identify a plurality of objects associated with a specific group based at least in part on the object data, each object associated with a geospatial location and a buffer area ——— 115

Determine a control area associated with the specific group based at least in part on the geospatial location and the buffer area of each object ——— 120

Determine a forward line associated with the specific group based at least in part on the geospatial location and the buffer area of each object ——— 125

Receive subsequent object data from at least one of the plurality of data sources ——— 130

Determine an updated geospatial location and/or an updated buffer area of one of the plurality of objects and/or identify a new object of the plurality of objects based at least in part on the subsequent object data ——— 135

Update the control area and/or the forward line based at least on the updated geospatial location, the updated buffer area, and/or the new object ——— 140

Cause a presentation of the forward line and/or the control area ——— 145

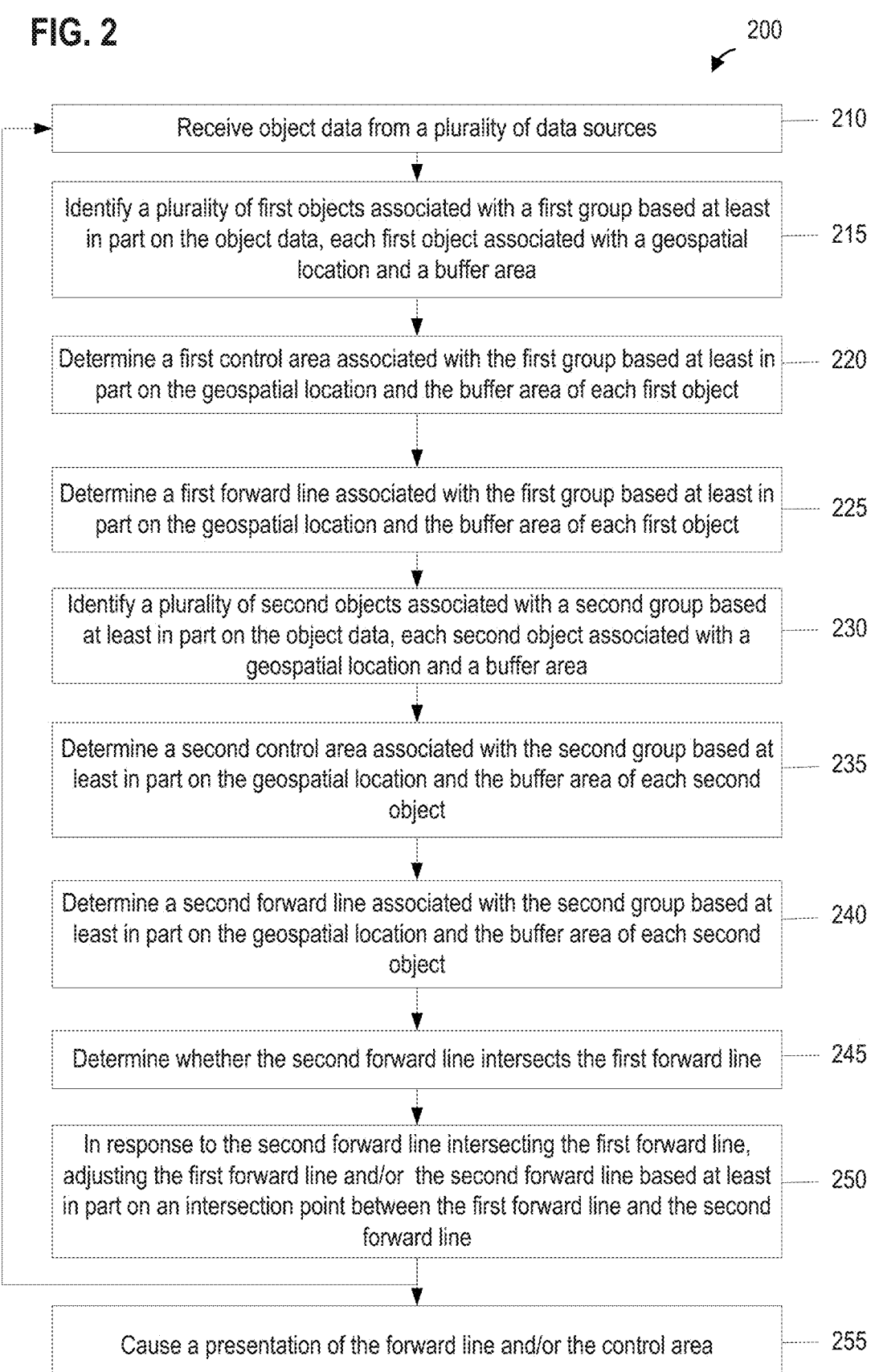

Receive object data from a plurality of data sources —— 210

Identify a plurality of first objects associated with a first group based at least in part on the object data, each first object associated with a geospatial location and a buffer area —— 215

Determine a first control area associated with the first group based at least in part on the geospatial location and the buffer area of each first object —— 220

Determine a first forward line associated with the first group based at least in part on the geospatial location and the buffer area of each first object —— 225

Identify a plurality of second objects associated with a second group based at least in part on the object data, each second object associated with a geospatial location and a buffer area —— 230

Determine a second control area associated with the second group based at least in part on the geospatial location and the buffer area of each second object —— 235

Determine a second forward line associated with the second group based at least in part on the geospatial location and the buffer area of each second object —— 240

Determine whether the second forward line intersects the first forward line —— 245

In response to the second forward line intersecting the first forward line, adjusting the first forward line and/or the second forward line based at least in part on an intersection point between the first forward line and the second forward line —— 250

Cause a presentation of the forward line and/or the control area —— 255

SYSTEMS AND METHODS FOR DYNAMIC VISUALIZATIONS OF CONTROL AREAS

CROSS REFERENCE TO RELATED APPLICATIONS

This application claims priority to U.S. Provisional Application No. 63/409,019, filed Sep. 22, 2022, incorporated by reference herein for all purposes.

TECHNICAL FIELD

Certain embodiments of the present disclosure are directed to systems and methods for visualizing control areas. More particularly, some embodiments of the present disclosure provide systems and methods for visualizing forward lines of groups.

BACKGROUND

A large amount of data has become available for analysis and visualization. In some examples, data (e.g., live streaming data) are continuously provided. In certain examples, data associated with different groups are presented to users.

Hence it is desirable to improve the techniques for visualization data for groups.

SUMMARY

Certain embodiments of the present disclosure are directed to systems and methods for visualizing control areas. More particularly, some embodiments of the present disclosure provide systems and methods for visualizing forward lines of groups.

In some embodiments, a method for control area visualization, the method comprising: receiving object data from a plurality of data sources; identifying a plurality of first objects associated with a first group based at least in part on the object data, each first object of the plurality of first objects being associated with a geospatial location and a buffer area; determining a first forward line associated with the first group based at least in part on the geospatial location and the buffer area of each first object of the plurality of first objects; and causing a presentation of the first forward line on a display; wherein the method is performed using one or more processors.

In certain embodiments, a system for control area visualization, the system comprising: one or more memories storing instructions thereon; one or more processors configured to execute the instructions and perform operations comprising: receiving object data from a plurality of data sources; identifying a plurality of first objects associated with a first group based at least in part on the object data, each first object of the plurality of first objects being associated with a geospatial location and a buffer area; determining a first forward line associated with the first group based at least in part on the geospatial location and the buffer area of each first object of the plurality of first objects; and causing a presentation of the first forward line on a display.

In some embodiments, a method for control area visualization, the method comprising: receiving object data from a plurality of data sources; identifying a plurality of first objects associated with a first group based at least in part on the object data, each first object of the plurality of first objects being associated with a geospatial location and a buffer area; determining a first control area associated with the first group based at least in part on the geospatial location and the buffer area of each first object of the plurality of first objects; and causing a presentation of the first control area on a display; wherein the method is performed using one or more processors.

Depending upon embodiments, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 1 is a simplified diagram showing a method for control area visualization according to certain embodiments of the present disclosure.

FIG. 2 is a simplified diagram showing a method for control area visualization according to certain embodiments of the present disclosure.

DETAILED DESCRIPTION

Figure 3:
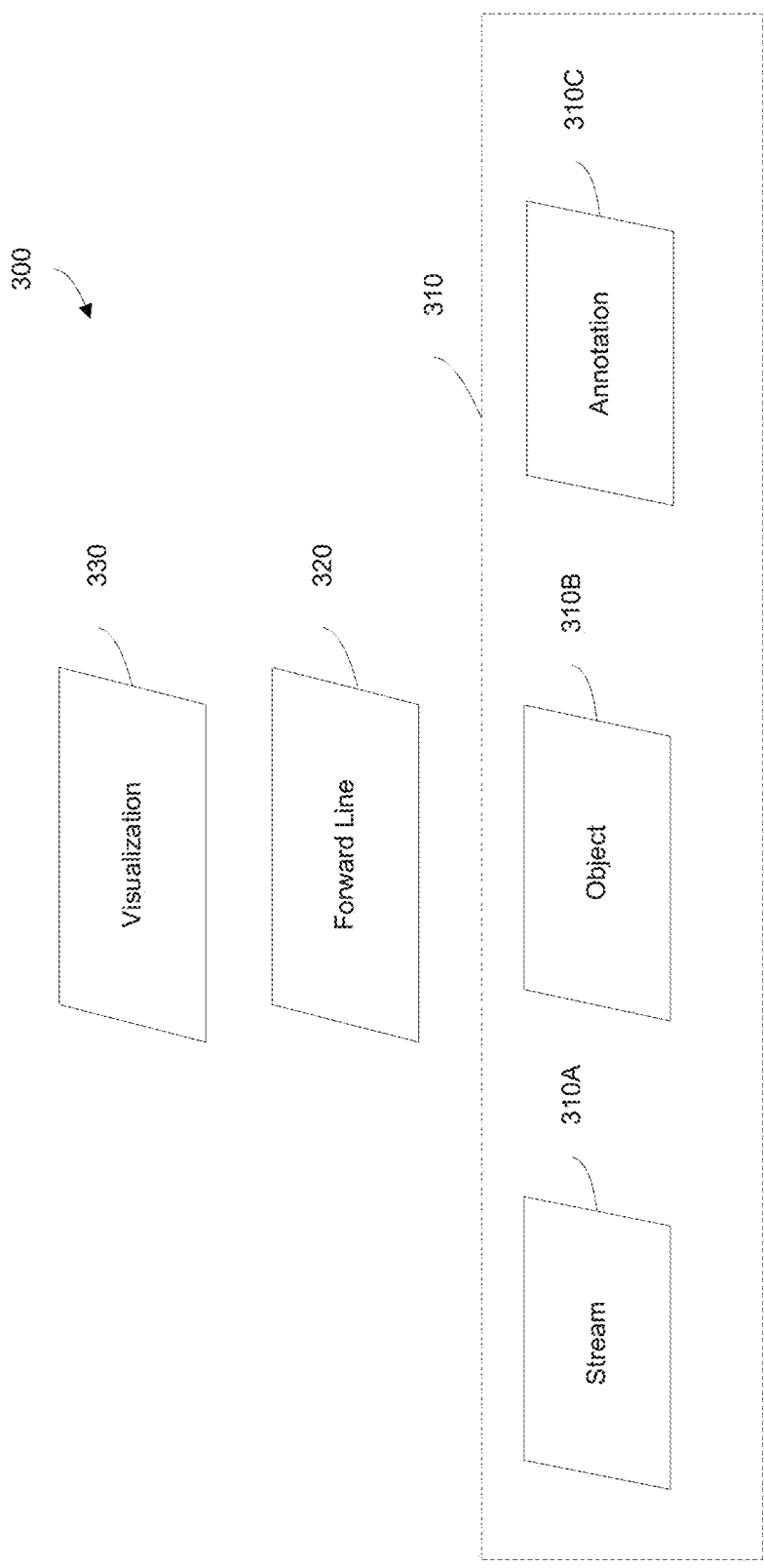
FIG. 3 is an illustrative example of a control area visualization architecture according to certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in the same software. In certain embodiments, the term "access" or "accessing" means retrieving data or information, and/or generating data or information.

At least certain embodiments of the present disclosure are directed to determining and visualizing control areas associated with specific groups of objects (e.g., parties, troops, etc.) In some embodiments, the control area visualization system is configured to generate a visualization representing a forward line of a group of objects (e.g., an estimation of the forward line, an approximation of the forward line, a forward line of troops (FLOT)).

According to some embodiments, the control area visualization system is configured to generate a dynamically updating visualization representing an approximation of the forward line of groups (e.g., friendly, partner, and enemy troops), given updating intelligence and sensor data curated by systems (e.g., users, sensors, devices). Historically, for example, visualizing the forward line of groups (e.g., troops) is an extremely manual process involving drawing on area representations (e.g., maps, screenshots of maps). In some examples, with each new and/or updated piece of data that comes in, the visualization is used to be updated manually. In some embodiments, the visualization system is configured to produce the forward line visualizations (e.g., within a few clicks), for example, with live updates and recalculations in response to inputs. In certain embodiments, when an input is received (e.g., device data, sensor data, an annotation on a map), the system is configured to automatically adjust the forward line visualization (e.g., FLOT visualization), also referred to as control area visualization, accordingly to provide live updates.

According to certain embodiments, the control area visualization system has the ability of the visualization to provide live updates in response to inputs changing without requiring manual user actions. In some embodiments, the visualization system can generate actual visualization of forward lines with a plurality of data sources (e.g., a plurality of data layers), for example, from devices, sensors, and/or user inputs. In certain embodiments, the visualization system has the ability to playback visualizations from prior states in time, for example, using the historic snapshots captured over time.

FIG. 1 is a simplified diagram showing a method 100 for control area visualization according to certain embodiments of the present disclosure. This diagram is merely an example. One of ordinary skill in the art would recognize many variations, alternatives, and modifications. The method 100 for control area visualization includes processes 110, 115, 120, 125, 130, 135, 140, and 145. Although the above has been shown using a selected group of processes for the method 100 for control area visualization, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

According to some embodiments, at the process 110, a control area visualization system is configured to receive object data from a plurality of data sources. In some embodiments, the object data includes geospatial and time data associated with an object, object captured data, annotation data associated with an object, and/or a combination thereof. In certain embodiments, the plurality of data sources include one or more devices (e.g., image devices, a device disposed on or integrated with a satellite, a device disposed on or integrated with a vehicle, etc.), one or more sensors (e.g., image sensors, audio sensors, etc.), and/or one or more user inputs (e.g., user annotations). In some embodiments, the plurality of data sources include at least one of a geospatial and time data source, an object capturing data source, and a user annotation data source. In certain embodiments, the plurality of data sources are corresponding to a plurality of data layers for receiving the data from the data sources. In some embodiments, the plurality of data layers include at least one of a geospatial and time data layer, an object capturing data layer, and a user annotation data layer.

In some embodiments, at the process 115, the control area visualization system identifies a plurality of objects associated with a specific group based at least in part on the object data, where each object is associated with a geospatial location. In certain embodiments, at least a part of the plurality of objects in the specific group are identified by the corresponding geospatial locations. In some embodiments, at least a part of the plurality of objects in the specific group are identified by a feature associated with the group (e.g., a logo, a marking, etc.). In certain embodiments, the system determines a buffer area for each object. In some embodiments, the buffer area is determined based at least in part on the corresponding data sources. In certain embodiments, each data source, for example, associated with a respective data layer, has a predetermined buffer radius (e.g., for a circle or a sphere) of the buffer area. In some embodiments, the buffer area and/or one or more parameters of the buffer area are received from a respective data source.

In certain embodiments, a first data source is associated with a first buffer area and a second data source is associated with a second buffer area, where the first buffer area is different from the second buffer area. In some embodiments, the first buffer area is different from the second buffer area in size. In certain embodiments, the first buffer area is different from the second buffer area in shape. In some embodiments, a first data source is associated with a first buffer radius (e.g., the buffer area being a circle or sphere) and a second data source is associated with a second buffer radius, where the first buffer radius is different from the second buffer radius. In certain embodiments, if an object is determined to be associated with a first buffer area and a second buffer area, the larger of the first buffer area and the second buffer area is used. In some embodiments, if an object is determined to be associated with a first buffer area and a second buffer area, the smaller of the first buffer area and the second buffer area is used.

Figure 5A:
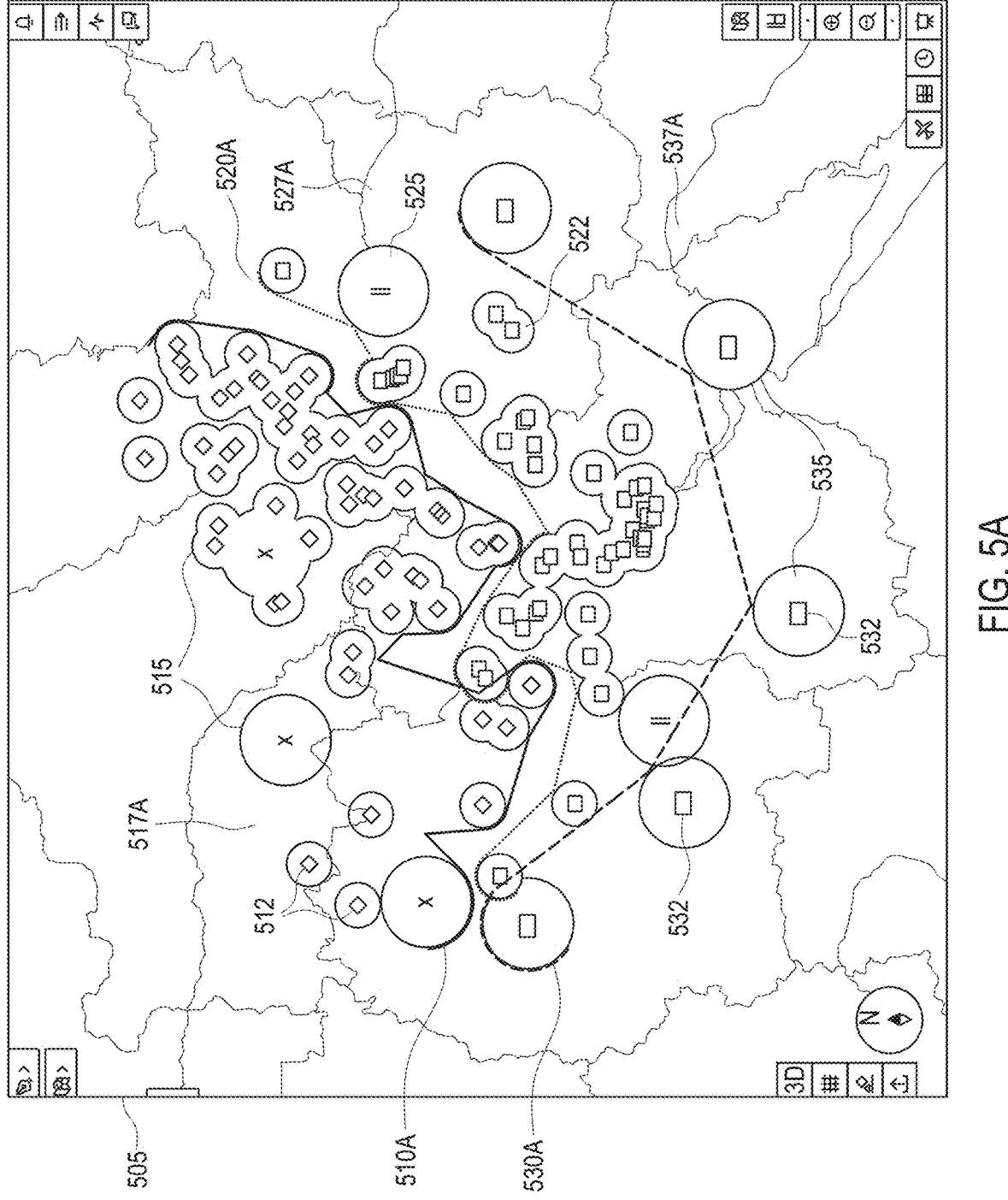
FIGS. 5A-5C show examples of control area visualization, according to certain embodiments of the present disclosure.

In certain embodiments, the buffer area has a center at the geospatial location of the object or the center location of the object. In some embodiments, the buffer area has a center proximate to the geospatial location of the object or the center location of the object. In certain embodiments, the buffer area is determined based at least in part on a type of object. For example, the buffer area is determined based upon the type of vehicle (e.g., passenger vehicle, truck, brand and model, etc.) and the parameters of vehicle operations (e.g., power range, acceleration capacity, etc.) for the object of a vehicle. As an example, the buffer area is determined based upon the type of weapon and/or the parameters of weapon (e.g., effective range, rounds per minute, etc.). FIG. 5A shows an example of control area visualization. As illustrated, 512, 522, 532 are example objects and 515, 525, 535 are example buffer areas.

According to certain embodiments, at the process 120, the control area visualization system determines a control area associated with the specific group based at least in part on the geospatial location and the buffer area of each object. In some embodiments, the control area includes all buffer areas of the objects in the specific group. In certain embodiments, the control area includes a part of the buffer areas of the objects in the specific group. As one example illustrated in FIG. 5A, 517A, 527A, 537A are example control areas.

According to some embodiments, at the process 125, the control area visualization system determines a forward line associated with the specific group based at least in part on the geospatial location and the buffer area of each object. In certain embodiments, the forward line is determined as a boundary (e.g., border) of the control area. In some embodiments, the forward line is determined using a graph theory, for example, the Delaunay Triangulation theory. As one example illustrated in FIG. 5A, 510A, 520A, 530A are example forward lines.

According to certain embodiments, at the process 145, the control area visualization system causes a presentation of the forward line and/or the control area. In some embodiments, the presentation of the forward line and/or the control area is overlaid on a map. For example, the presentation shown in FIGS. 5A-5C, for example, overlaid on a map 505. In some embodiments, at the process 130, the system receives subsequent object data from at least one of the plurality of data sources. In certain embodiments, the subsequent object data includes a new location of an object. In some embodiments, the subsequent object data includes a new object. In certain embodiments, the subsequent object data includes a user annotation (e.g., moving the object, adding an object, deleting an object, changing a buffer area, etc.). In some embodiments, the system is configured to delete the buffer area when the corresponding object is deleted.

Figure 5B:
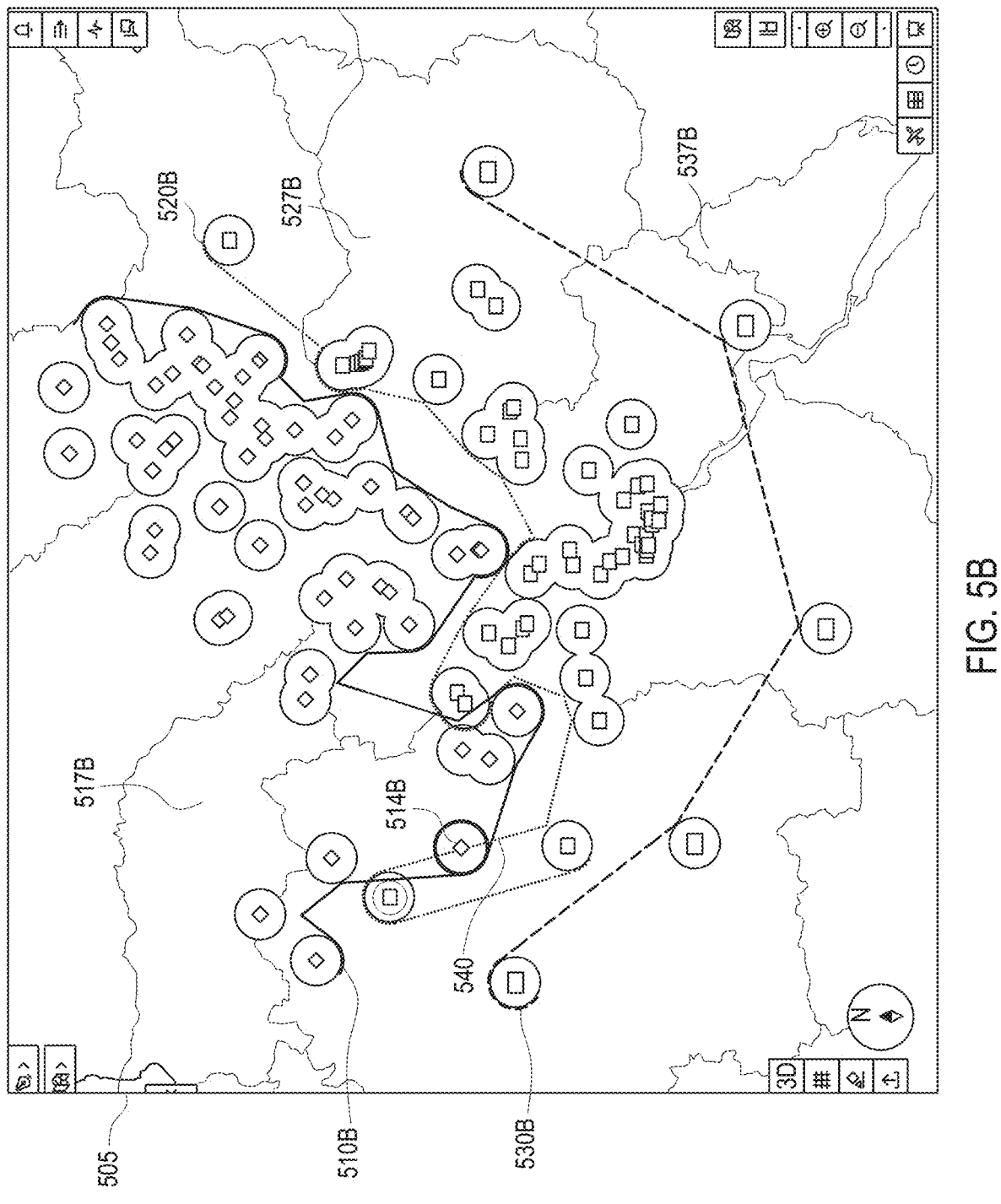

In certain embodiments, at the process 135, the system determines an updated geospatial location and/or an updated buffer area of one of the plurality of objects and/or identifies a new object of the plurality of objects based at least in part on the subsequent object data. In some embodiments, at the process 140, the control area visualization system updates the control area and/or the forward line based at least on the updated geospatial location, the updated buffer area, and/or the new object. For example, as illustrated in FIG. 5B, the forward line 520B goes through the object 514B, which can be either an object moved, or a new object identified, and the forward line 520B has been updated to 520C in FIG. 5C, which does not go through the object 514B.

According to some embodiments, the control area visualization system receives subsequent object data recurrently, for example, going back to the process 130. In certain embodiments, the system requests object data periodically (e.g., every 1 second, every 3 seconds, every 1 minute, etc.). In some embodiments, the system updates the control area and/or the forward line periodically (e.g., every 1 second, every 3 seconds, every 1 minute, etc.). In some embodiments, the system updates the control area and/or the forward line at demand. In certain embodiments, at the process 145, the control area visualization system causes a presentation of the forward line and/or the control area. For example, the presentations shown in FIG. 5A and FIG. 5B. In the example illustrated in FIGS. 5A-5C, three groups and three control areas are shown. In certain embodiments, the system can be used to visualize two or more (e.g., three, five, ten, etc.) groups, corresponding forward lines, and corresponding control areas.

FIG. 2 is a simplified diagram showing a method 200 for control area visualization according to certain embodiments of the present disclosure. This diagram is merely an example. One of ordinary skill in the art would recognize many variations, alternatives, and modifications. The method 200 for control area visualization includes processes 210, 215, 220, 225, 230, 235, 240, 245, 250 and 255. Although the above has been shown using a selected group of processes for the method 200 for control area visualization, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

According to some embodiments, at the process 210, a control area visualization system is configured to receive object data from a plurality of data sources. In some embodiments, the object data includes geospatial and time data associated with an object, object captured data, annotation data associated with an object, and/or a combination thereof. In certain embodiments, the plurality of data sources include one or more devices (e.g., image devices, a device disposed on or integrated with a satellite, a device disposed on or integrated with a vehicle, etc.), one or more sensors (e.g., image sensors, audio sensors, etc.), and/or one or more user inputs (e.g., user annotations). In some embodiments, the plurality of data sources include at least one of a geospatial and time data source, an object capturing data source, and a user annotation data source. In certain embodiments, the plurality of data sources are corresponding to a plurality of data layers for receiving the data from the data sources. In some embodiments, the plurality of data layers include at least one of a geospatial and time data layer, an object capturing data layer, and a user annotation data layer.

In some embodiments, at the process 215, the control area visualization system identifies a plurality of first objects associated with a first group based at least in part on the object data, where each first object is associated with a geospatial location. In certain embodiments, at least a part of the plurality of first objects in the first group are identified by the corresponding geospatial locations. In some embodiments, at least a part of the plurality of first objects in the first group are identified by a feature associated with the first group (e.g., a logo, a marking, a symbol, etc.). In certain embodiments, the system determines a buffer area for each first object. In some embodiments, the buffer area is determined based at least in part on the corresponding data sources. In certain embodiments, each data source, for example, associated with a respective data layer, has a predetermined buffer radius (e.g., for a circle or a sphere) of the buffer area. In some embodiments, the buffer area and/or one or more parameters of the buffer area are received from a respective data source. In some examples, the parameters of the buffer area include geometry parameters (e.g., size, shape, radius, etc.).

In certain embodiments, a first data source is associated with a first buffer area and a second data source is associated with a second buffer area, where the first buffer area is different from the second buffer area. In some embodiments, the first buffer area is different from the second buffer area in size. In certain embodiments, the first buffer area is different from the second buffer area in shape. In some embodiments, a first data source is associated with a first buffer radius (e.g., the buffer area being a circle or sphere) and a second data source is associated with a second buffer radius, where the first buffer radius is different from the second buffer radius. In certain embodiments, if an object is determined to be associated with a first buffer area and a second buffer area, the larger of the first buffer area and the second buffer area is used. In some embodiments, if an object is determined to be associated with a first buffer area and a second buffer area, the smaller of the first buffer area and the second buffer area is used.

In certain embodiments, the buffer area has a center at the geospatial location of the object or the center location of the object. In some embodiments, the buffer area has a center proximate to the geospatial location of the object or the center location of the object. In certain embodiments, the buffer area is determined based at least in part on a type of object. For example, the buffer area is determined based upon the type of vehicle (e.g., passenger vehicle, truck, brand and model, etc.) and the parameters of vehicle operations (e.g., power range, acceleration capacity, etc.) for the object of a vehicle. As an example, the buffer area is determined based upon the type of weapon and/or the parameters of weapon (e.g., effective range, rounds per minute, etc.). FIG. 5A shows an example of control area visualization. As illustrated, 512, 522, 532 are example objects and 515, 525, 535 are example buffer areas.

According to certain embodiments, at the process 220, the control area visualization system determines a first control area associated with the first group based at least in part on the geospatial location and the buffer area of each first object. In some embodiments, the control area includes all buffer areas of the first objects in the first group. In certain embodiments, the control area includes a part of the buffer areas of the first objects in the first group. In some examples, the system uses geometry union of buffer areas of objects in a certain group to determine the area controlled by the certain group. As one example illustrated in FIG. 5A, 517A, 527A, 537A are example control areas.

According to some embodiments, at the process 225, the control area visualization system determines a first forward line associated with the first group based at least in part on the geospatial location and the buffer area of each first object. In certain embodiments, the forward line is determined as a boundary (e.g., border) of the control area. In some embodiments, the forward line is determined using a graph theory, for example, the Delaunay Triangulation theory. As one example illustrated in FIG. 5A, 510A, 520A, 530A are example forward lines.

In some embodiments, at the process 230, the control area visualization system identifies a plurality of second objects associated with a second group based at least in part on the object data, where each second object is associated with a geospatial location. In certain embodiments, at least a part of the plurality of second objects in the second group are identified by the corresponding geospatial locations. In some embodiments, at least a part of the plurality of second objects in the second group are identified by a feature associated with the second group (e.g., a logo, a marking, a symbol, etc.). In certain embodiments, the system determines a buffer area for each second object. In some embodiments, the buffer area is determined based at least in part on the corresponding data sources. In certain embodiments, each data source, for example, associated with a respective data layer, has a predetermined buffer radius (e.g., for a circle or a sphere) of the buffer area. In some embodiments, the buffer area and/or one or more parameters of the buffer area are received from a respective data source. As one example illustrated in FIG. 5A, 512 are example first objects of a first group and 522 are example second objects of a second group.

According to certain embodiments, at the process 235, the control area visualization system determines a second control area associated with the second group based at least in part on the geospatial location and the buffer area of each second object. In some embodiments, the control area includes all buffer areas of the second objects in the second group. In certain embodiments, the control area includes a part of the buffer areas of the second objects in the second group. As one example illustrated in FIG. 5A, 517A, 527A, 537A are example control areas.

According to some embodiments, at the process 240, the control area visualization system determines a second forward line associated with the second group based at least in part on the geospatial location and the buffer area of each second object. In certain embodiments, the second forward line is determined as a boundary (e.g., border) of the control area. In some embodiments, the second forward line is determined using a graph theory, for example, the Delaunay Triangulation theory. As one example illustrated in FIG. 5A, 510A, 520A, 530A are example forward lines, where 510A is an example first forward line and 520A is an example second forward line.

According to certain embodiments, the first group and the second group are in a contest. In some embodiments, the control areas of the first group and the second group do not overlap. In certain embodiments, at the process 245, the control area visualization system determines whether the second forward line intersects the first forward line. In some embodiments, in response to the second forward line intersecting the first forward line, the system adjusts the first forward line and/or the second forward line based at least in part on an intersection point between the first forward line and the second forward line.

Figure 5C:
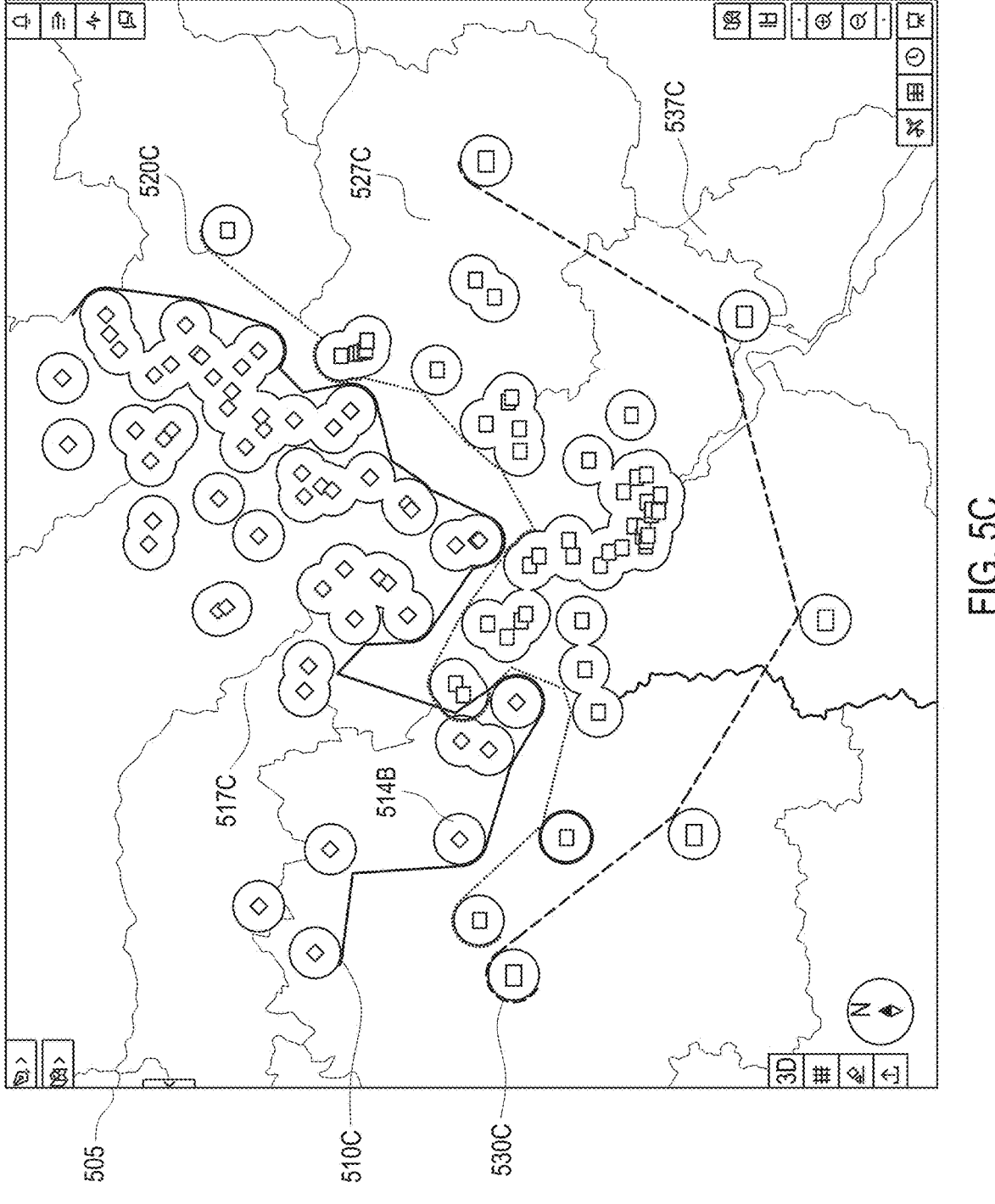

FIG. 5B shows control areas 517B, 527B, and 537B, and forward lines 510B, 520B, and 530B. FIG. 5C shows control areas 517C, 527C, and 537C, and forward lines 510C, 520C, and 530C. In the example illustrated in FIG. 5B, the second forward line 520B intersects the first forward line 510B at the intersection point 540. In the example illustrated in FIG. 5C, the system adjusts the first forward line 510C and/or the second forward line 520C based at least in part on the intersection point 540 between the first forward line 510B and the second forward line 520B.

In some embodiments, the control area visualization system receives subsequent object data from at least one of the plurality of data sources. In certain embodiments, the subsequent object data includes a new location of an object. In some embodiments, the subsequent object data includes a new object. In certain embodiments, the subsequent object data includes a user annotation (e.g., moving the object, adding an object, deleting an object, changing a buffer area, etc.). In some embodiments, the system is configured to delete the buffer area when the corresponding object is deleted.

In certain embodiments, the system determines an updated geospatial location and/or an updated buffer area of one of the plurality of objects (e.g., first objects, second objects, etc.) and/or identifies a new object of the plurality of objects based at least in part on the subsequent object data. In some embodiments, the control area visualization system updates the control area (e.g., first control area, second control area) and/or the forward line (e.g., first forward line, second forward line) based at least on the updated geospatial location, the updated buffer area, and/or the new object. For example, as illustrated in FIGS. 5B and 5C, the object 514B is either an object moved, or a new object identified, and the forward line 510B has been updated, such that the forward line 510B intersects with the forward line 520B. As an example, the system uses an algorithm to deconflict the one or more intersections such that the updated front lines do not intersect.

According to some embodiments, the control area visualization system receives subsequent object data recurrently, for example, going back to the process 210. In certain embodiments, the system requests object data periodically (e.g., every 1 second, every 3 seconds, every 1 minute, etc.). In some embodiments, the system updates the control area and/or the forward line periodically (e.g., every 1 second, every 3 seconds, every 1 minute, etc.). In some embodiments, the system updates the control area and/or the forward line on demand (e.g., by triggering), for example, triggered by user inputs and/or annotations. In certain embodiments, at the process 255, the control area visualization system causes a presentation of the forward line and/or the control area. In some embodiments, the presentation of the forward line and/or the control area is overlaid on a map. For example, the presentation shown in FIGS. 5A-5C, for example, overlaid on a map 505.

FIG. 3 is an illustrative example of a control area visualization architecture 300 according to certain embodiments of the present disclosure. This diagram is merely an example. One of ordinary skill in the art would recognize many variations, alternatives, and modifications. The control area visualization architecture 300 includes one or more data layers 310, one or more forward line layers 320, and one or more visualization layers 330. Although the above has been shown using a selected group of layers for the control area visualization architecture 300 for an application builder, there can be many alternatives, modifications, and variations. For example, some of the layers may be expanded and/or combined. Other layers may be inserted and/or replaced to those noted above. Further details of these layers are found throughout the present disclosure.

According to certain embodiments, the control area visualization architecture includes one or more data layers 310. In some embodiments, the data layers 310 include one or more streaming layers 310A (e.g., a geo-time layer, a layer to receive geospatial and/or time data from a data source, etc.), one or more object layers 310B (e.g., a layer to retrieve data stored in database, a layer to retrieve object data stored in database, etc.) and one or more annotation layers 310C (e.g., a layer to receive and/or retrieve user entered and/or generated data, etc.). In certain embodiments, the streaming layers 310A include at least one layer to receive live geospatial and/or time data. In some embodiments, the streaming layers 310A include at least one layer to receive live streaming data. In certain embodiments, the streaming layers 310A include at least one layer to receive live data that updates frequently (e.g., extremely frequently, with a frequency greater than 1 update/second). In some embodiments, at least one streaming layer 310A is associated with observation specifications and/or queries. In certain embodiments, the object layers 310B include one or more search layers and/or objects layers. In some embodiments, one or more annotation layers 310C are presented and/or overlaid on the same map that the forward line layer 320 is generated on.

According to some embodiments, the forward line layer 320 and/or the visualization layer 330 refreshes periodically at a predetermined frequency (e.g., every 3 minutes). In certain embodiments, due to their dependency on potentially live updating data that lives outside of the architecture, the forward line layers 320 are recomputed at a pre-defined cadence of periodically or on demand. In some embodiments, the one or more forward line layers 320 and/or one or more visualization layers 330 recompute and/or refresh periodically (e.g., every 3 minutes). In certain embodiments, the forward line layer 320 and/or visualization layer 330 include a map and is representative of that moment in time until the next recalculation. In certain embodiments, the one or more forward line layers 310 can be triggered updates on demand (e.g., "immediately"). In some examples, the one or more forward line layers 320 can be triggered with the addition, deletion, and/or moving an annotation in an annotation layer 310C, which is used as input or editing parameters of the forward line layer 320. In certain embodiments, the forward line layer 320 is configured to be recomputed at least at a predetermined frequency (e.g., at least every 3 minutes).

According to certain embodiments, the forward line layer 320 is configured to include the method 100 illustrated in FIG. 1 or the method 200 illustrated in FIG. 2. In some embodiments, the forward line layer 320 includes one or more models. In some embodiments, a model, or referred to as a computing model, includes a model to process data. A model includes, for example, an AI model, a machine learning (ML) model, a deep learning (DL) model, an image processing model, a computer vision model, an algorithm, other computing models, and/or a combination thereof. In certain embodiments, the forward line layer 320 uses filtering to select data of a specific group (e.g., friend, enemy, partner, etc.). In some embodiments, the forward line layer 320 uses a model to classify one or more objects into a specific group.

According to some embodiments, the forward line layer can be shared with other systems. In certain embodiments, the forward line layer can be imported into a map system (e.g., using a map). For example, the architecture 300 uses a geo-time layer X (e.g., a layer to receive geospatial and/or time data) and an annotation layer Y created on Map A and used as input to a forward line layer Z on Map A. In some examples, the architecture 300 allows a forward line layer 320 on Map B to live import the forward line layer Z on Map B. In certain examples, the forward line layer Z on Map A and the imported forward line layer Z on Map B can both receive updates at the same cadence.

According to certain embodiments, the data layers 310 that can be used as inputs in the architecture 300 must be present on the same map the forward line layer is being created on. For example, the architecture 300 a geo-time layer X and an annotation layer Y created on Map A. In some examples, Map A is live imported into Map B. In certain examples, the architecture 300 will not allow the use of the imported layers (e.g., the geo-time layer X or the annotation layer Y) as part of any forward line calculations performed on Map B. As an example, the architecture 300 allows the use of the imported layers (e.g., the geo-time layer X or the annotation layer Y) as part of any forward line calculations performed on Map A.

According to some embodiments, forward line snapshots (e.g., control area snapshots) are captured when changes have occurred to one or more layers in the control layer visualization architecture 300. In certain embodiments, updates are triggered differently depending on what layer types are being used as input to the forward line layer 320. In some embodiments, for annotation layers 310C and/or objects layers 310B used as inputs, adding/deleting/moving an annotation can trigger an update. In certain embodiments, for streaming layers 310A used as inputs, if any new data that comes through would result in a change to the forward line output, an update is triggered.

According to certain embodiments, the forward line snapshots are discarded based on some logic in order to not grow exponentially over time, but still capture meaningful changes at some cadence. In some examples, the logic includes that for each history snapshot, it is kept if: 1) it has no older snapshot; 2) it's older than 1 day and >1 day newer than the next older snapshot; 3) it's older than 1 hour and >1 hour newer than the next older snapshot; or 4) it's less than one hour old.

Figure 4:
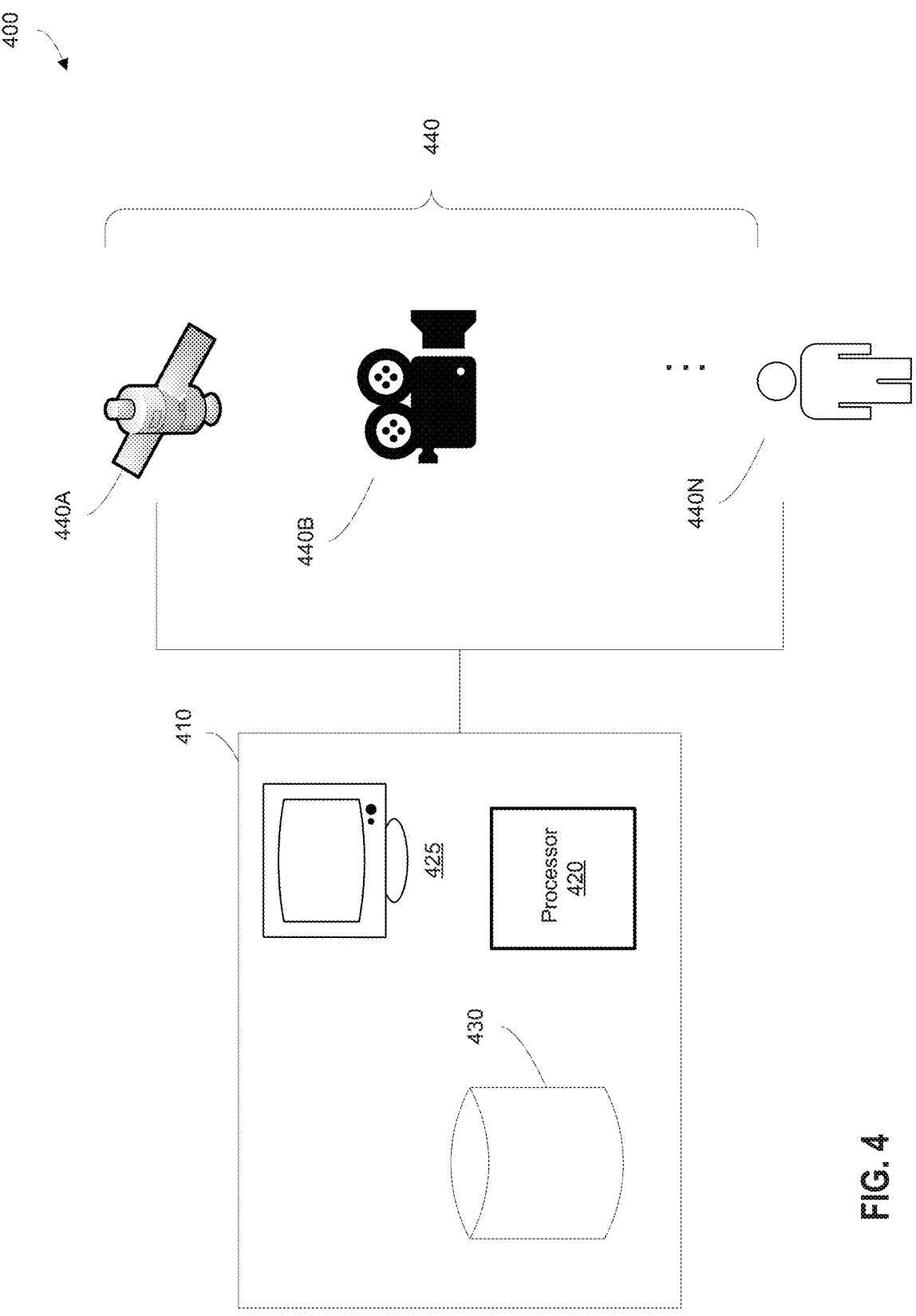
FIG. 4 is an illustrative example of a control area visualization environment, according to certain embodiments of the present disclosure.

FIG. 4 is an illustrative example of a control area visualization environment 400, according to certain embodiments of the present disclosure. FIG. 4 is merely an example. One of the ordinary skilled in the art would recognize many variations, alternatives, and modifications. According to certain embodiments, the control area visualization environment 400 includes the control area visualization system 410 and one or more data sources 440. In some embodiments, the control area visualization system 410 includes one or more processors 420, one or more memories 430, and one or more displays 425. Although the above has been shown using a selected group of components in the control area visualization environment 400, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to some embodiments, the control area visualization system 410 and/or the one or more processors 420 is configured to receive object data from a plurality of data sources 440, for example, via one or more data layers (e.g., data layers 310 in FIG. 3). In some embodiments, the object data includes geospatial and time data associated with an object, object captured data, annotation data associated with an object, and/or a combination thereof. In certain embodiments, the plurality of data sources include one or more devices (e.g., image devices, a device disposed on or integrated with a satellite, a device disposed on or integrated with a vehicle, etc.), one or more sensors (e.g., image sensors, audio sensors, etc.), and/or one or more user inputs (e.g., user annotations). In some embodiments, the plurality of data sources 440 include at least one of a geospatial and time data source 440A, an object capturing data source 440B, and a user annotation data source 440N. In certain embodiments, the plurality of data sources are corresponding to a plurality of data layers (not shown) in the control area visualization system 410 for receiving the data from the data sources. In some embodiments, the plurality of data layers include at least one of a geospatial and time data layer, an object capturing data layer, and a user annotation data layer.

In some embodiments, the control area visualization system 410 and/or the one or more processors 420 identifies a plurality of first objects associated with a first group based at least in part on the object data, where each first object is associated with a geospatial location. In certain embodiments, at least a part of the plurality of first objects in the first group are identified by the corresponding geospatial locations. In some embodiments, at least a part of the plurality of first objects in the first group are identified by a feature associated with the first group (e.g., a logo, a marking, a symbol, etc.). In certain embodiments, the system determines a buffer area for each first object. In some embodiments, the buffer area is determined based at least in part on the corresponding data sources. In certain embodiments, each data source, for example, associated with a respective data layer, has a predetermined buffer radius (e.g., for a circle or a sphere) of the buffer area. In some embodiments, the buffer area and/or one or more parameters of the buffer area are received from a respective data source.

In certain embodiments, a first data source is associated with a first buffer area and a second data source is associated with a second buffer area, where the first buffer area is different from the second buffer area. In some embodiments, the first buffer area is different from the second buffer area in size. In certain embodiments, the first buffer area is different from the second buffer area in shape. In some embodiments, a first data source is associated with a first buffer radius (e.g., the buffer area being a circle or sphere) and a second data source is associated with a second buffer radius, where the first buffer radius is different from the second buffer radius. In certain embodiments, if an object is determined to be associated with a first buffer area and a second buffer area, the larger of the first buffer area and the second buffer area is used. In some embodiments, if an object is determined to be associated with a first buffer area and a second buffer area, the smaller of the first buffer area and the second buffer area is used.

In certain embodiments, the buffer area has a center at the geospatial location of the object or the center location of the object. In some embodiments, the buffer area has a center proximate to the geospatial location of the object or the center location of the object. In certain embodiments, the buffer area is determined based at least in part on a type of object. For example, the buffer area is determined based upon the type of vehicle (e.g., passenger vehicle, truck, brand and model, etc.) and the parameters of vehicle operations (e.g., power range, acceleration capacity, etc.) for the object of a vehicle. As an example, the buffer area is determined based upon the type of weapon and/or the parameters of weapon (e.g., effective range, rounds per minute, etc.). FIG. 5A shows an example of control area visualization. As illustrated, 512, 522, 532 are example objects and 515, 525, 535 are example buffer areas.

According to certain embodiments, the control area visualization system 410 and/or the one or more processors 420 determines a first control area associated with the first group based at least in part on the geospatial location and the buffer area of each first object. In some embodiments, the control area includes all buffer areas of the first objects in the first group. In certain embodiments, the control area includes a part of the buffer areas of the first objects in the first group. In some examples, the system uses geometry union of buffer areas of objects in a certain group to determine the area controlled by the certain group. As one example illustrated in FIG. 5A, 517A, 527A, 537A are example control areas.

According to some embodiments, the control area visualization system 410 and/or the one or more processors 420 determines a first forward line associated with the first group based at least in part on the geospatial location and the buffer area of each first object. In certain embodiments, the forward line is determined as a boundary (e.g., border) of the control area. In some embodiments, the forward line is determined using a graph theory, for example, the Delaunay Triangulation theory. As one example illustrated in FIG. 5A, 510A, 520A, 530A are example forward lines.

In some embodiments, the control area visualization system 410 and/or the one or more processors 420 identifies a plurality of second objects associated with a second group based at least in part on the object data, where each second object is associated with a geospatial location. In certain embodiments, at least a part of the plurality of second objects in the second group are identified by the corresponding geospatial locations. In some embodiments, at least a part of the plurality of second objects in the second group are identified by a feature associated with the second group (e.g., a logo, a marking, a symbol, etc.). In certain embodiments, the system determines a buffer area for each second object. In some embodiments, the buffer area is determined based at least in part on the corresponding data sources. In certain embodiments, each data source, for example, associated with a respective data layer, has a predetermined buffer radius (e.g., for a circle or a sphere) of the buffer area. In some embodiments, the buffer area and/or one or more parameters of the buffer area are received from a respective data source. As an example illustrated in FIG. 5A, 512 are example first objects of a first group and 522 are example second objects of a second group.

According to certain embodiments, the control area visualization system 410 and/or the one or more processors 420 determines a second control area associated with the second group based at least in part on the geospatial location and the buffer area of each second object. In some embodiments, the control area includes all buffer areas of the second objects in the second group. In certain embodiments, the control area includes a part of the buffer areas of the second objects in the second group. As one example illustrated in FIG. 5A, 517A, 527A, 537A are example control areas.

According to some embodiments, the control area visualization system 410 and/or the one or more processors 420 determines a second forward line associated with the second group based at least in part on the geospatial location and the buffer area of each second object. In certain embodiments, the second forward line is determined as a boundary (e.g., border) of the control area. In some embodiments, the second forward line is determined using a graph theory, for example, the Delaunay Triangulation theory. As one example illustrated in FIG. 5A, 510A, 520A, 530A are example forward lines, where 510A is an example first forward line and 520A is an example second forward line.

According to certain embodiments, the first group and the second group are in a contest. In some embodiments, the control areas of the first group and the second group do not overlap. In certain embodiments, the control area visualization system 410 and/or the one or more processors 420 determines whether the second forward line intersects the first forward line. In some embodiments, in response to the second forward line intersecting the first forward line, the system adjusts the first forward line and/or the second forward line based at least in part on an intersection point between the first forward line and the second forward line.

FIG. 5B shows control areas 517B, 527B, and 537B, and forward lines 510B, 520B, and 530B. FIG. 5C shows control areas 517C, 527C, and 537C, and forward lines 510C, 520C, and 530C. In the example illustrated in FIG. 5B, the second forward line 520B intersects the first forward line 510B at the intersection point 540. In the example illustrated in FIG. 5C, the system adjusts the first forward line 510C and/or the second forward line 520C based at least in part on the intersection point 540 between the first forward line 510B and the second forward line 520B.

In some embodiments, the control area visualization system 410 and/or the one or more processors 420 receives subsequent object data from at least one of the plurality of data sources. In certain embodiments, the subsequent object data includes a new location of an object. In some embodiments, the subsequent object data includes a new object. In certain embodiments, the subsequent object data includes a user annotation (e.g., moving the object, adding an object, deleting an object, changing a buffer area, etc.). In some embodiments, the system is configured to delete the buffer area when the corresponding object is deleted.

In certain embodiments, the system 410 and/or the one or more processors 420 determines an updated geospatial location and/or an updated buffer area of one of the plurality of objects (e.g., first objects, second objects, etc.) and/or identifies a new object of the plurality of objects based at least in part on the subsequent object data. In some embodiments, the control area visualization system updates the control area (e.g., first control area, second control area) and/or the forward line (e.g., first forward line, second forward line) based at least on the updated geospatial location, the updated buffer area, and/or the new object. For example, as illustrated in FIG. 5B, the object 514 is either an object moved, or a new object identified, and the forward line 510B has been updated, such that the forward line 510B intersects with the forward line 520B.

According to some embodiments, the control area visualization system 410 and/or the one or more processors 420 receives subsequent object data recurrently. In certain embodiments, the system requests object data periodically (e.g., every 1 second, every 3 seconds, every 1 minute, etc.). In some embodiments, the system updates the control area and/or the forward line periodically (e.g., every 1 second, every 3 seconds, every 1 minute, etc.). In some embodiments, the system updates the control area and/or the forward line on demand (e.g., by triggering), for example, triggered by user inputs and/or annotations. In certain embodiments, at the process 255, the control area visualization system causes a presentation of the forward line and/or the control area. In some embodiments, the presentation of the forward line and/or the control area is overlaid on a map. For example, the presentation shown in FIGS. 5A-5C, for example, overlaid on a map 505.

In some embodiments, the repository 430 can include geospatial data, time data, object data, buffer area data, forward line data, control area data, and/or the like. The repository 430 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the control area visualization environment 400 can execute software or firmware stored in non-transitory computer-readable medium to implement various processing steps. Various components and processors of the control area visualization environment 400 can be implemented by one or more computing devices including, but not limited to, circuits, a computer, a cloud-based processing unit, a processor, a processing unit, a microprocessor, a mobile computing device, and/or a tablet computer. In some cases, various components of the control area visualization environment 400 (e.g., processors 420) can be implemented on a shared computing device. Alternatively, a component of the control area visualization environment 400 can be implemented on multiple computing devices. In some implementations, various modules and components of the control area visualization environment 400 can be implemented as software, hardware, firmware, or a combination thereof. In some cases, various components of the image scoring environment 400 can be implemented in software or firmware executed by a computing device.

Various components of the control area visualization environment 400 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 6:
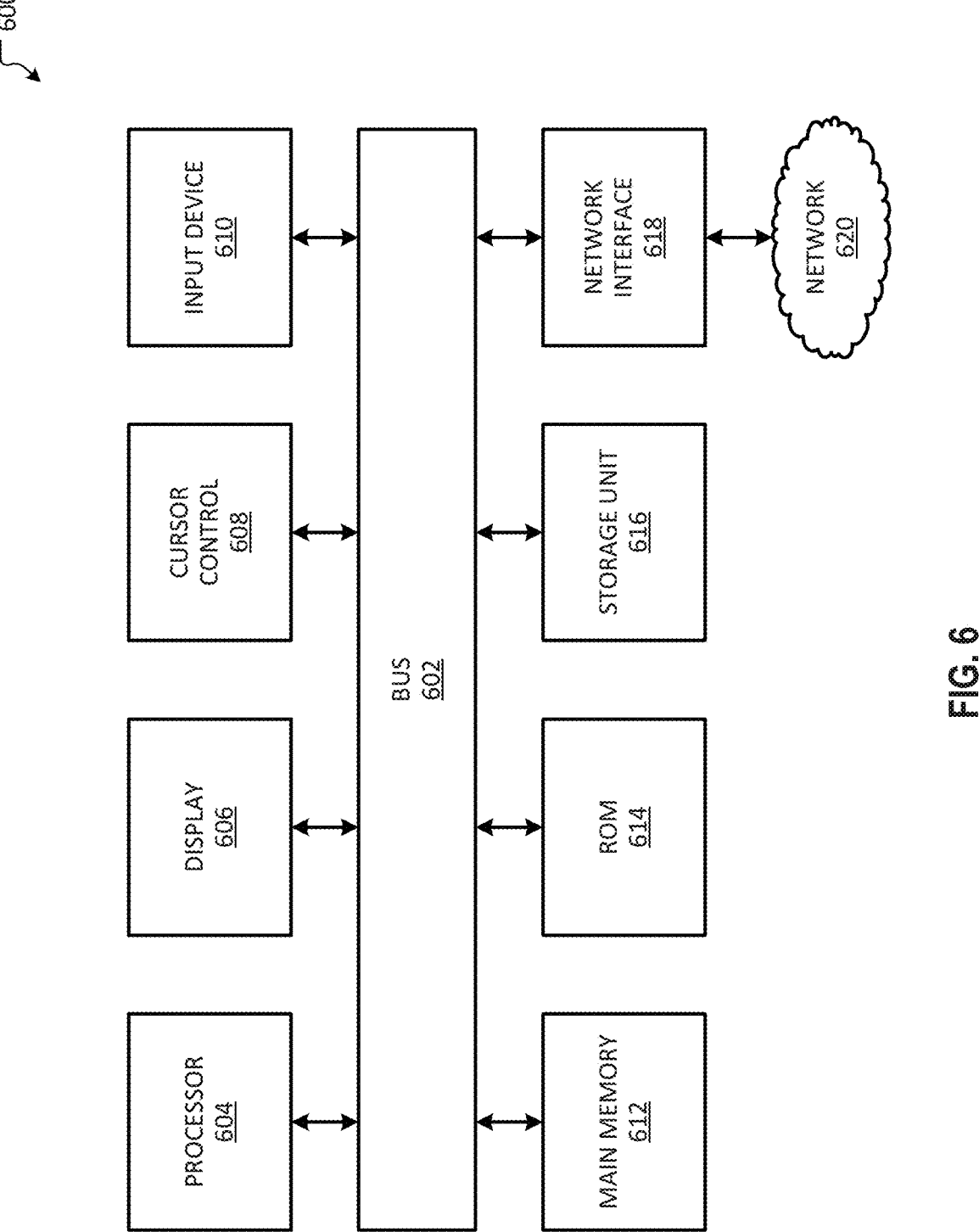
FIG. 6 is a simplified diagram showing a computing system for implementing a system for control area visualization in accordance with at least one example set forth in the disclosure.

FIG. 6 is a simplified diagram showing a computing system for implementing a system 600 for control area visualization in accordance with at least one example set forth in the disclosure. This diagram is merely an example, which should not unduly limit the scope of the claims. One of ordinary skill in the art would recognize many variations, alternatives, and modifications.

The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the methods 100, and/or 200 are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to certain embodiments, a method for control area visualization, the method comprising: receiving object data from a plurality of data sources; identifying a plurality of first objects associated with a first group based at least in part on the object data, each first object of the plurality of first objects being associated with a geospatial location and a buffer area; determining a first forward line associated with the first group based at least in part on the geospatial location and the buffer area of each first object of the plurality of first objects; and causing a presentation of the first forward line on a display; wherein the method is performed using one or more processors. For example, the method is implemented according to at least FIG. 1, FIG. 2, FIG. 3, FIG. 4, and/or FIG. 6.

In some embodiments, the first forward line is associated with a first control area associated with the first group, and the first control area includes the geographic location and the buffer area of each first object of the plurality of first objects. In certain embodiments, the method further comprises: receiving subsequent object data from at least one of the plurality of data sources, the subsequent object data being collected after the object data is collected; determining an updated geospatial location of one first object of the plurality of first objects; and updating the first forward line based at least in part on the updated geospatial location of the one first object. In some embodiments, the method further comprises: receiving subsequent object data from at least one of the plurality of data sources, the subsequent object data being collected after the object data is collected; determining an updated buffer area of one first object of the plurality of first objects; and updating the first forward line based at least in part on the updated buffer area of the one first object.

In certain embodiments, the method further comprises: identifying a plurality of second objects associated with a second group based at least in part on the object data, each second object of the plurality of second objects being associated with a geospatial location and a buffer area; and determining a second forward line associated with the second group based at least in part on the geospatial location and the buffer area of each second object of the plurality of second objects. In some embodiments, the method further comprises: determining whether the second forward line intersects the first forward line; in response to the second forward line intersecting the first forward line, adjusting the second forward line based at least in part on an intersection point between the first forward line and the second forward line. In certain embodiments, the method further comprises: identifying a plurality of third objects associated with a third group based at least in part on the object data, each third object of the plurality of third objects being associated with a geospatial location and a buffer area; and determining a third forward line associated with the third group based at least in part on the geospatial location and the buffer area of each third object of the plurality of third objects. In some embodiments, a first data source of the plurality of data sources corresponds to a first buffer area, wherein a second data source of the plurality of data sources corresponds to a second buffer area, wherein the first buffer area is different from the second buffer area.

According to certain embodiments, a system for control area visualization, the system comprising: one or more memories storing instructions thereon; one or more processors configured to execute the instructions and perform operations comprising: receiving object data from a plurality of data sources; identifying a plurality of first objects associated with a first group based at least in part on the object data, each first object of the plurality of first objects being associated with a geospatial location and a buffer area; determining a first forward line associated with the first group based at least in part on the geospatial location and the buffer area of each first object of the plurality of first objects; and causing a presentation of the first forward line on a display. For example, the system is implemented according to at least FIG. 1, FIG. 2, FIG. 3, FIG. 4, and/or FIG. 6.

In some embodiments, the first forward line is associated with a first control area associated with the first group, and the first control area includes the geographic location and the buffer area of each first object of the plurality of first objects. In certain embodiments, the operations further comprise: receiving subsequent object data from at least one of the plurality of data sources, the subsequent object data being collected after the object data is collected; determining an updated geospatial location of one first object of the plurality of first objects; and updating the first forward line based at least in part on the updated geospatial location of the one first object. In some embodiments, the operations further comprise: receiving subsequent object data from at least one of the plurality of data sources, the subsequent object data being collected after the object data is collected; determining an updated buffer area of one first object of the plurality of first objects; and updating the first forward line based at least in part on the updated buffer area of the one first object.

In certain embodiments, the operations further comprise: identifying a plurality of second objects associated with a second group based at least in part on the object data, each second object of the plurality of second objects being associated with a geospatial location and a buffer area; and determining a second forward line associated with the second group based at least in part on the geospatial location and the buffer area of each second object of the plurality of second objects. In some embodiments, the operations further comprise: determining whether the second forward line intersects the first forward line; in response to the second forward line intersecting the first forward line, adjusting the second forward line based at least in part on an intersection point between the first forward line and the second forward line. In certain embodiments, the operations further comprise: identifying a plurality of third objects associated with a third group based at least in part on the object data, each third object of the plurality of third objects being associated with a geospatial location and a buffer area; and determining a third forward line associated with the third group based at least in part on the geospatial location and the buffer area of each third object of the plurality of third objects. In some embodiments, a first data source of the plurality of data sources corresponds to a first buffer area, wherein a second data source of the plurality of data sources corresponds to a second buffer area, wherein the first buffer area is different from the second buffer area.

According to certain embodiments, a method for control area visualization, the method comprising: receiving object data from a plurality of data sources; identifying a plurality of first objects associated with a first group based at least in part on the object data, each first object of the plurality of first objects being associated with a geospatial location and a buffer area; determining a first control area associated with the first group based at least in part on the geospatial location and the buffer area of each first object of the plurality of first objects; and causing a presentation of the first control area on a display; wherein the method is performed using one or more processors. For example, the method is implemented according to at least FIG. 1, FIG. 2, FIG. 3, FIG. 4, and/or FIG. 6.

In some embodiments, the first control area includes the geographic location and the buffer area of each first object of the plurality of first objects. In certain embodiments, the method further comprises: receiving subsequent object data from at least one of the plurality of data sources, the subsequent object data being collected after the object data is collected; determining an updated geospatial location of one first object of the plurality of first objects; and updating the first control area based at least in part on the updated geospatial location of the one first object. In some embodiments, the method further comprises: receiving subsequent object data from at least one of the plurality of data sources, the subsequent object data being collected after the object data is collected; determining an updated buffer area of one first object of the plurality of first objects; and updating the first control area based at least in part on the updated buffer area of the one first object.

In certain embodiments, the method further comprises: identifying a plurality of second objects associated with a second group based at least in part on the object data, each second object of the plurality of second objects being associated with a geospatial location and a buffer area; and determining a second control area associated with the second group based at least in part on the geospatial location and the buffer area of each second object of the plurality of second objects.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for control area visualization, the method comprising:

receiving object data from a plurality of data sources;

identifying a plurality of first objects associated with a first group based at least in part on the object data, each first object of the plurality of first objects being associated with a geospatial location and a buffer area, wherein the buffer area is determined based on a type and one or more parameters of each first object of the plurality of first objects;

determining a first forward line associated with the first group based at least in part on the geospatial location and the buffer area of each first object of the plurality of first objects, wherein the first forward line is associated with a first control area associated with the first group, wherein the first control area includes the geographic location and the buffer area of each first object of the plurality of first objects; and causing a presentation of the first forward line on a display;

wherein the method is performed using one or more processors.

2. The method of claim 1, further comprising:

receiving subsequent object data from at least one of the plurality of data sources, the subsequent object data being collected after the object data is collected;

determining an updated geospatial location of one first object of the plurality of first objects; and updating the first forward line based at least in part on the updated geospatial location of the one first object.

3. The method of claim 1, further comprising:

receiving subsequent object data from at least one of the plurality of data sources, the subsequent object data being collected after the object data is collected;

determining an updated buffer area of one first object of the plurality of first objects; and updating the first forward line based at least in part on the updated buffer area of the one first object.

4. The method of claim 1, further comprising:

identifying a plurality of second objects associated with a second group based at least in part on the object data, each second object of the plurality of second objects being associated with a geospatial location and a buffer area; and determining a second forward line associated with the second group based at least in part on the geospatial location and the buffer area of each second object of the plurality of second objects.

5. The method of claim 4, further comprising:

determining whether the second forward line intersects the first forward line;

in response to the second forward line intersecting the first forward line, adjusting the second forward line based at least in part on an intersection point between the first forward line and the second forward line.

6. The method of claim 4, further comprising:

identifying a plurality of third objects associated with a third group based at least in part on the object data, each third object of the plurality of third objects being associated with a geospatial location and a buffer area; and determining a third forward line associated with the third group based at least in part on the geospatial location and the buffer area of each third object of the plurality of third objects.

7. The method of claim 1, wherein a first data source of the plurality of data sources corresponds to a first buffer area, wherein a second data source of the plurality of data sources corresponds to a second buffer area, wherein the first buffer area is different from the second buffer area.

8. A system for control area visualization, the system comprising:

one or more memories storing instructions thereon;

one or more processors configured to execute the instructions and perform operations comprising:

receiving object data from a plurality of data sources;

identifying a plurality of first objects associated with a first group based at least in part on the object data, each first object of the plurality of first objects being associated with a geospatial location and a buffer area, wherein the buffer area is determined based on a type and one or more parameters of each first object of the plurality of first objects;

determining a first forward line associated with the first group based at least in part on the geospatial location and the buffer area of each first object of the plurality of first objects, wherein the first forward line is associated with a first control area associated with the first group, wherein the first control area includes the geographic location and the buffer area of each first object of the plurality of first objects; and causing a presentation of the first forward line on a display.

9. The system of claim 8, wherein the operations further comprise:

receiving subsequent object data from at least one of the plurality of data sources, the subsequent object data being collected after the object data is collected;

determining an updated geospatial location of one first object of the plurality of first objects; and updating the first forward line based at least in part on the updated geospatial location of the one first object.

10. The system of claim 8, wherein the operations further comprise:

receiving subsequent object data from at least one of the plurality of data sources, the subsequent object data being collected after the object data is collected;

determining an updated buffer area of one first object of the plurality of first objects; and updating the first forward line based at least in part on the updated buffer area of the one first object.

11. The system of claim 8, wherein the operations further comprise:

identifying a plurality of second objects associated with a second group based at least in part on the object data, each second object of the plurality of second objects being associated with a geospatial location and a buffer area; and determining a second forward line associated with the second group based at least in part on the geospatial location and the buffer area of each second object of the plurality of second objects.

12. The system of claim 11, wherein the operations further comprise:

determining whether the second forward line intersects the first forward line;

in response to the second forward line intersecting the first forward line, adjusting the second forward line based at least in part on an intersection point between the first forward line and the second forward line.

13. The system of claim 11, wherein the operations further comprise:

identifying a plurality of third objects associated with a third group based at least in part on the object data, each third object of the plurality of third objects being associated with a geospatial location and a buffer area; and determining a third forward line associated with the third group based at least in part on the geospatial location and the buffer area of each third object of the plurality of third objects.

14. The system of claim 8, wherein a first data source of the plurality of data sources corresponds to a first buffer area, wherein a second data source of the plurality of data sources corresponds to a second buffer area, wherein the first buffer area is different from the second buffer area.

15. A method for control area visualization, the method comprising:

receiving object data from a plurality of data sources;

identifying a plurality of first objects associated with a first group based at least in part on the object data, each first object of the plurality of first objects being associated with a geospatial location and a buffer area, wherein the buffer area is determined based on a type and one or more parameters of each first object of the plurality of first objects;

determining a first control area associated with the first group based at least in part on the geospatial location and the buffer area of each first object of the plurality of first objects, wherein the first control area includes the geographic location and the buffer area of each first object of the plurality of first objects; and causing a presentation of the first control area on a display;

wherein the method is performed using one or more processors.

16. The method of claim 15, further comprising:

receiving subsequent object data from at least one of the plurality of data sources, the subsequent object data being collected after the object data is collected;

determining an updated geospatial location of one first object of the plurality of first objects; and updating the first control area based at least in part on the updated geospatial location of the one first object.

17. The method of claim 15, further comprising:

identifying a plurality of second objects associated with a second group based at least in part on the object data, each second object of the plurality of second objects being associated with a geospatial location and a buffer area; and determining a second control area associated with the second group based at least in part on the geospatial location and the buffer area of each second object of the plurality of second objects.

* * * * *